(12) United States Patent
Frank

(10) Patent No.: US 7,031,689 B2
(45) Date of Patent: Apr. 18, 2006

(54) DIFFERENTIAL RADIO

(76) Inventor: Michael L. Frank, 20 Mariposa Ave., Los Gatos, CA (US) 95030

( * ) Notice: Subject to any disclaimer, the term of this patent is extended or adjusted under 35 U.S.C. 154(b) by 633 days.

(21) Appl. No.: 10/008,492

(22) Filed: Nov. 13, 2001

(65) Prior Publication Data

US 2003/0092408 A1    May 15, 2003

(51) Int. Cl.
*H04B 1/28* (2006.01)
(52) U.S. Cl. .................. 455/333; 455/323; 333/133
(58) Field of Classification Search ........... 455/130, 455/341, 323, 333; 333/133, 189
See application file for complete search history.

(56) References Cited

U.S. PATENT DOCUMENTS

| | | | |
|---|---|---|---|
| 6,075,495 A * | 6/2000 | Podgorski | 343/786 |
| 6,134,453 A * | 10/2000 | Sainton et al. | 455/553.1 |
| 6,407,649 B1 * | 6/2002 | Tikka et al. | 333/133 |
| 6,721,544 B1 * | 4/2004 | Franca-Neto | 455/83 |
| 2002/0153965 A1 * | 10/2002 | Ruby et al. | 333/133 |

OTHER PUBLICATIONS

McNamar D, FBAR Technology Shrinks CDMA Handset Duplexers, Sep. 2000, Microwaves and RF, p. 71-79.*

* cited by examiner

*Primary Examiner*—Curtis Kuntz
*Assistant Examiner*—Matthew C Sams

(57) ABSTRACT

A cellphone handset may be excited in a completely differential mode. The antenna, e.g. a simple dipole or a minimal Yagi-Uda with a reflector, may be printed into the printed circuit board. A differential duplexer may be implemented using FBAR technology. The LNA (Low Noise Amplifier) and the PA (Power Amplifier) can both be differential.

2 Claims, 7 Drawing Sheets

DIFFERENTIAL RADIO

BACKGROUND

Modern cellular telephones use single ended front ends. Specifically, the power amplifier (PA), the duplexer, and the low noise amplifier (LNA) are all single ended. Often this architecture is propagated further down the chain, through the first frequency converters. In the circuitry that follows the converters, the phone transitions to differential.

The original designs all used discrete transistors that are very difficult to and expensive to configure differentially. The best performance at the onset of a new technology is typically through the use of discrete components, and the original requirements called for state of the art performance. At some point when the technology has advanced sufficiently that it is no longer performance driven, circuit integration becomes an option.

FIG. 1 illustrates a functional block diagram corresponding to cellular handset of the prior art. The antenna is connected to a single ended transmit path and a single ended receive path. Both paths are connected to the rest of the radio which would include the IF, the baseband, the processor, and the software.

The antenna is inherently differential. The ground plane of the printed circuit board acts as a reflector and ground return as is the second pole of the dipole. Nonetheless, the antenna is perforce driven as though single ended. This topology has several problems. The grounding of the both the LNA and the PA must be minimized, often at significant cost. The return current of the antenna gets distributed throughout the phone, causing interference. The PA itself broadcasts, requiring shielding within the phone. Any interference will be picked up by any single ended amplifier.

SUMMARY

A cellphone handset may be excited in a completely differential mode. The antenna, e.g. a simple dipole or a minimal Yagi-Uda with a reflector, may be printed into the printed circuit board. A differential duplexer may be implemented using FBAR technology. The LNA (Low Noise Amplifier) and the PA (Power Amplifier) can both be differential.

DETAILED DESCRIPTION

Figure 1:
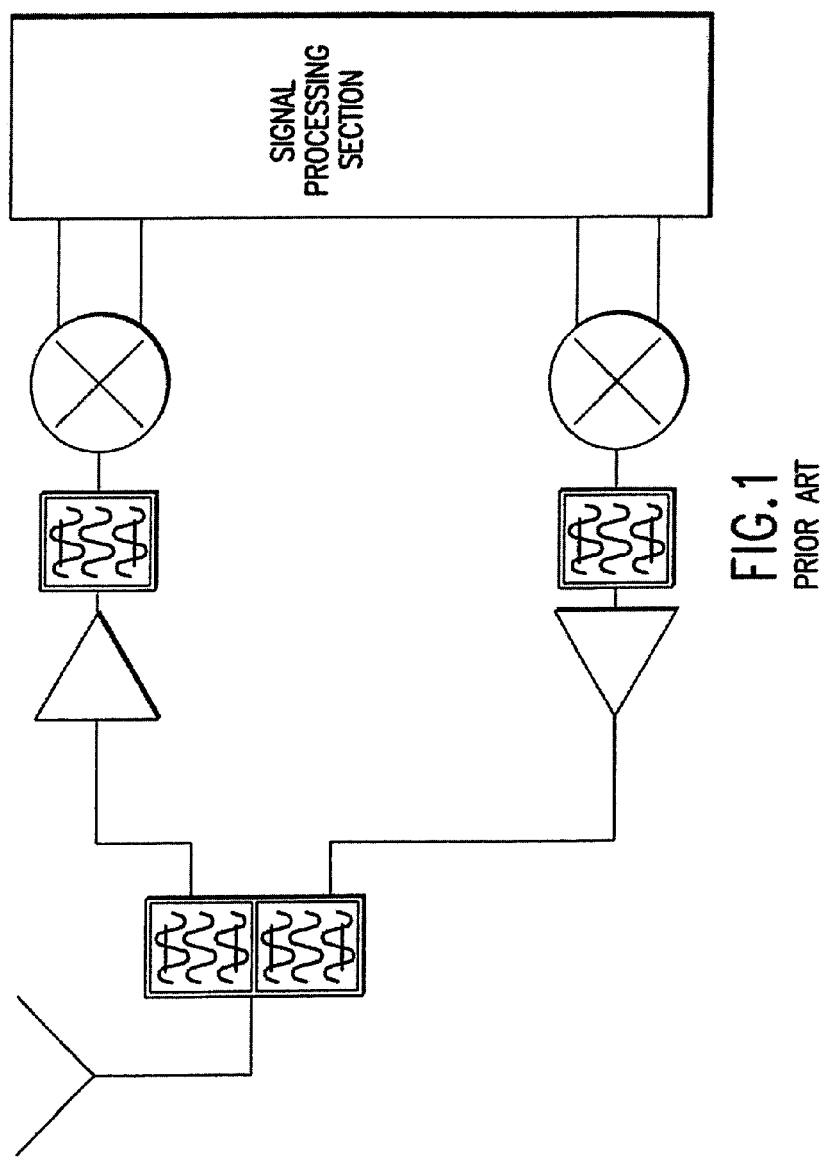
FIG. 1 illustrates a functional block diagram corresponding to cellular handset of the prior art.
Figure 2:
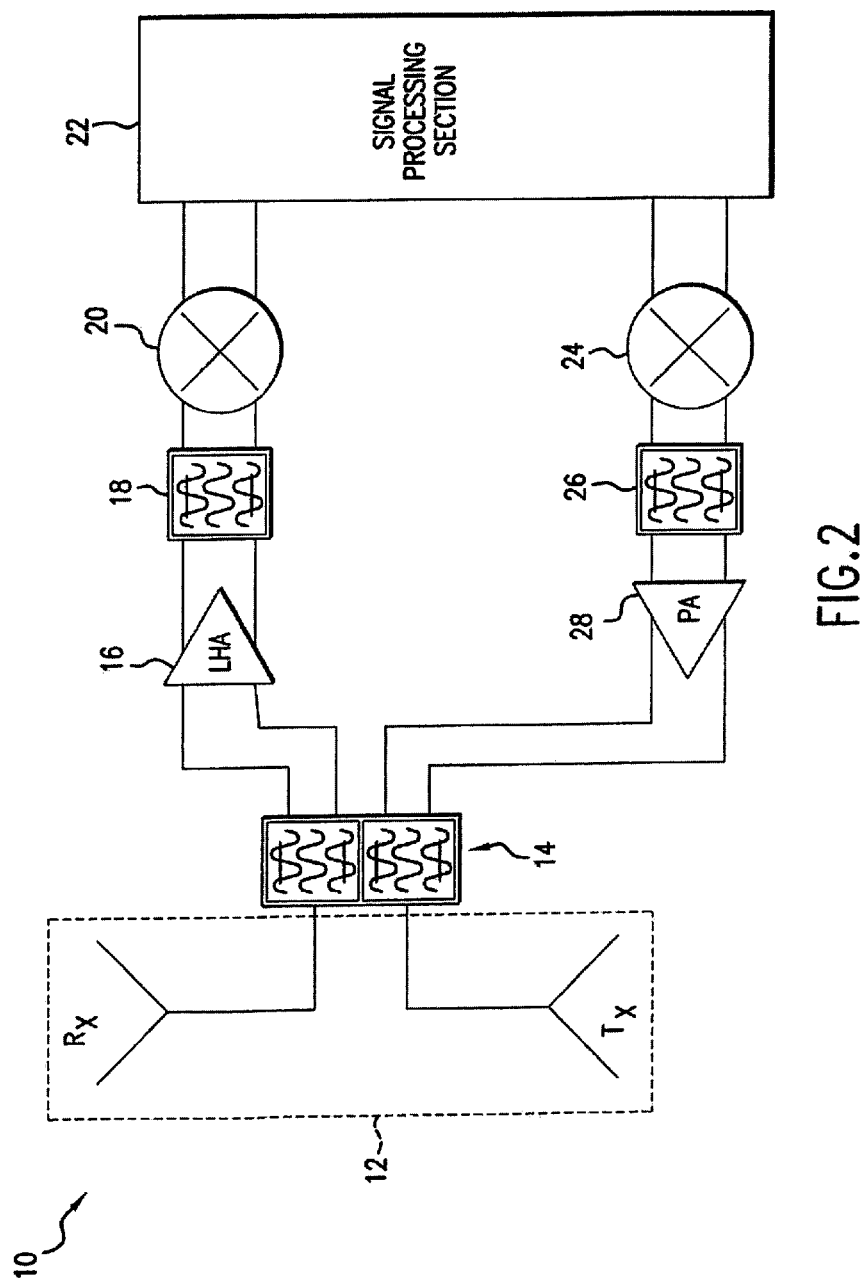
FIG. 2 illustrates a differential handset of the present invention.

FIG. 2 illustrates a functional block diagram 10 according to the present invention. A differential antenna 12 is connected to a duplexer 14. The receive portion of the duplexer 14 are inputs to a differential low noise amplifier (LNA) 16. A first filter 18 interposes the differential outputs of the LNA 16 and a first mixer 20. A signal processing section 22 receives the differential output signals of the first mixer 20. A second mixer 24 receives the differential output signals from the signal processing section 22. A second filter 26 receives the differential output signals from the second mixer 24. A power amplifier 28 interposes the second filter 26 and the transmit portion of the duplexer 14.

When the entire system is differential, then the ground plane is independent of the antenna. In addition, the differential nature of the PA results in less leakage, the differential nature of the LNA results in less coupling. Since coupling is reduced, there would be less requirement for shielding. Integrated circuit technology prefers the differential mode, since the technique reduces the effects of the package parasitics and substrate leakage. Consequently, the present invention supports a higher level of integration than the circuit topologies of the prior art.

Figure 3:
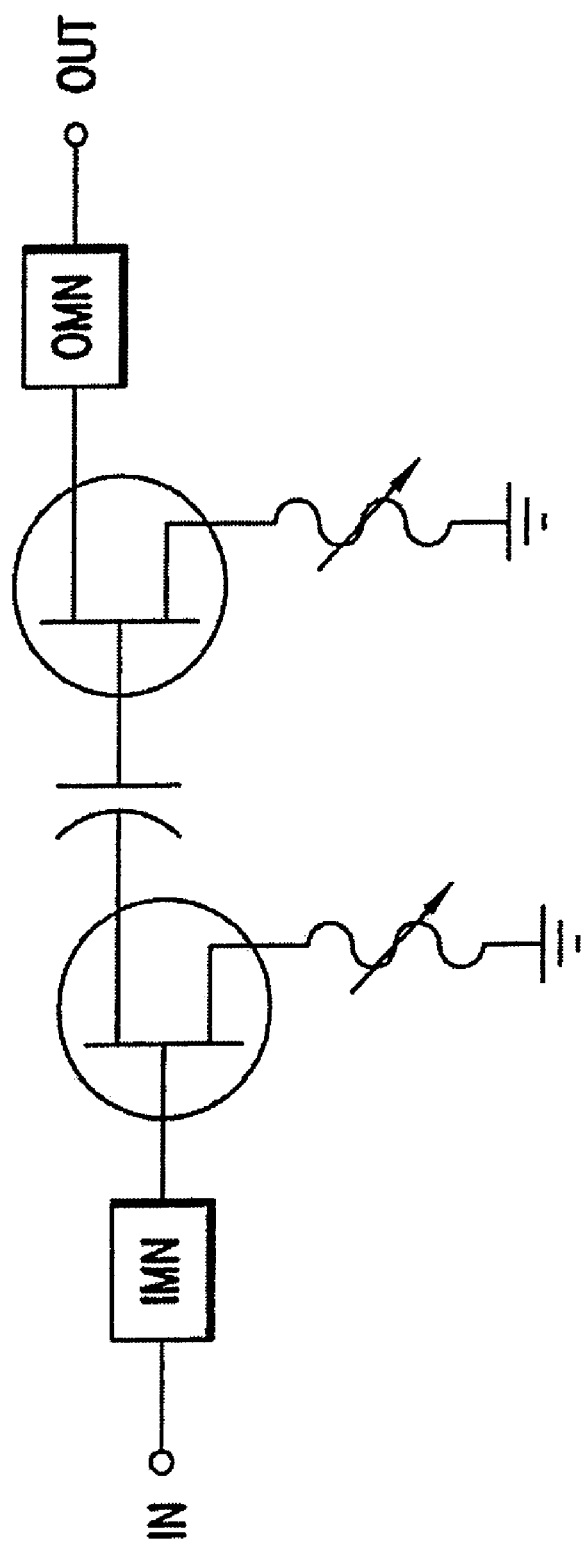
FIG. 3 illustrates the single ended power amplifier shown in FIG. 1.

FIG. 3 illustrates a single-ended power amplifier of the prior art. To be effective, the inductors in the sources of the each stage of the amplifier must be made as short as feasible. In practice, this requires upwards of 20 individual bondwires.

Figure 4:
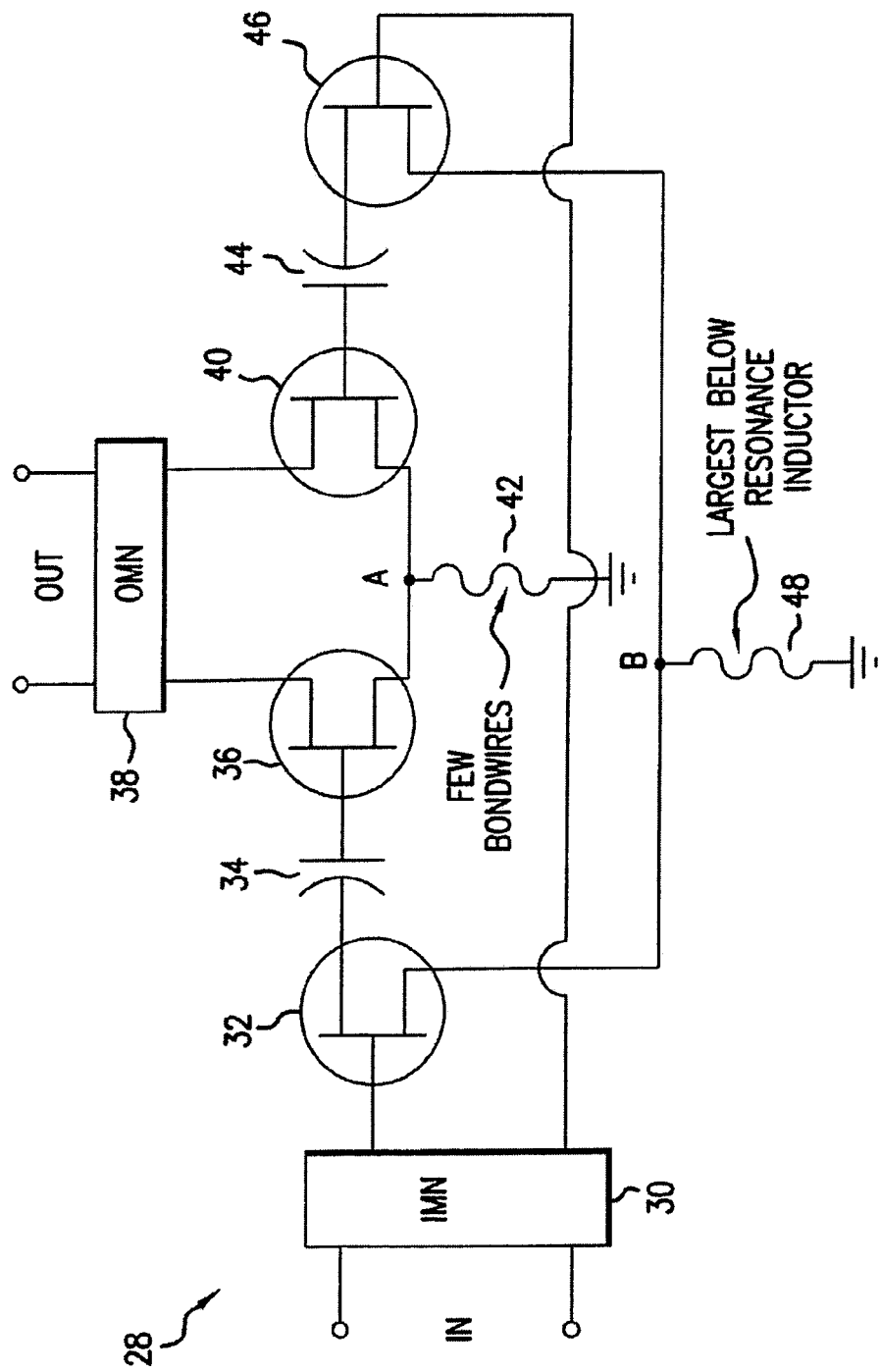
FIG. 4 illustrates the differential power amplifier shown in FIG. 2.

FIG. 4 illustrates the differential power amplifier (PA) 28 shown in FIG. 2. An input matching network (IMN) 30 has two inputs and a first and second output. A differential input is applied across the two inputs of the IMN 30. A gate of a first field effect transistor (FET) 32 is connected to the first output of the IMN 30. A first capacitor 34 interposes the drain of the first FET 32 and a gate of the second FET 36. An output matching (OMN) 38 connects across the drain of the second FET 36 and a drain of the third FET 40. A differential output reading may be taken across the two outputs of the OMN 38. The sources of the second and third FET 36, 40 are tied together at node A. A first inductor 42 connects between node A and ground. A second capacitor 44 connects between the gate of the third FET 40 and a drain of a fourth FET 46. The gate of the fourth FET 46 connects to the second output of the IMN 30. The sources of the first and fourth FET 32, 46 are tied together at node B. A second inductor 48 connects between node B and ground.

There are some specific advantages to having a differential PA. For the same signal as used in the prior art, the output voltage across each device is half of the total voltage. This effectively increases the headroom of the transistor, enabling increased efficiency. In addition, each device requires only half the current, so the output impedance is twice as high as for the equivalent prior art single ended PA. This results in reduced transformation losses at the output.

When driven differentially, the differential PA has a virtual ground, eliminating the required numerous grounding bond wires. High impedance to ground at the common node is advantageous, leading to high common mode rejection. The many bond wires in the single ended design are required to reduce the common lead impedance, which directly reduces the gain. Lower gain in the output stage requires more power in the driver stage immediately proceeding, lowering the efficiency of the entire PA.

A differential PA interferes much less, since the signal is contained much more effectively inside the transmission line. As the far field interference is common mode, there is less of a problem in the receive portion of the handset. Thus, significantly reducing the need for shielding.

One industry requirement is to survive when the antenna is very mismatched as much as 20:1, causing a large standing wave at the output of the PA. This standing wave has the highest intensity in the half of the cycle when the amplifier current is a minimum and the transistor present high impedance. This requires a high breakdown voltage to survive and is hence a very non-linear condition. Many handsets use an isolator between the PA and the antenna to accommodate this requirement. However, a differential stage does not face as severe a worst case standing wave. When one transistor is in the high impedance state, the other is low, greatly reducing the instantaneous voltage. The performance improvement may be sufficient to eliminate the required isolator. Without the isolator, the PA peak output power could be reduced, again increasing efficiency.

Figure 5:
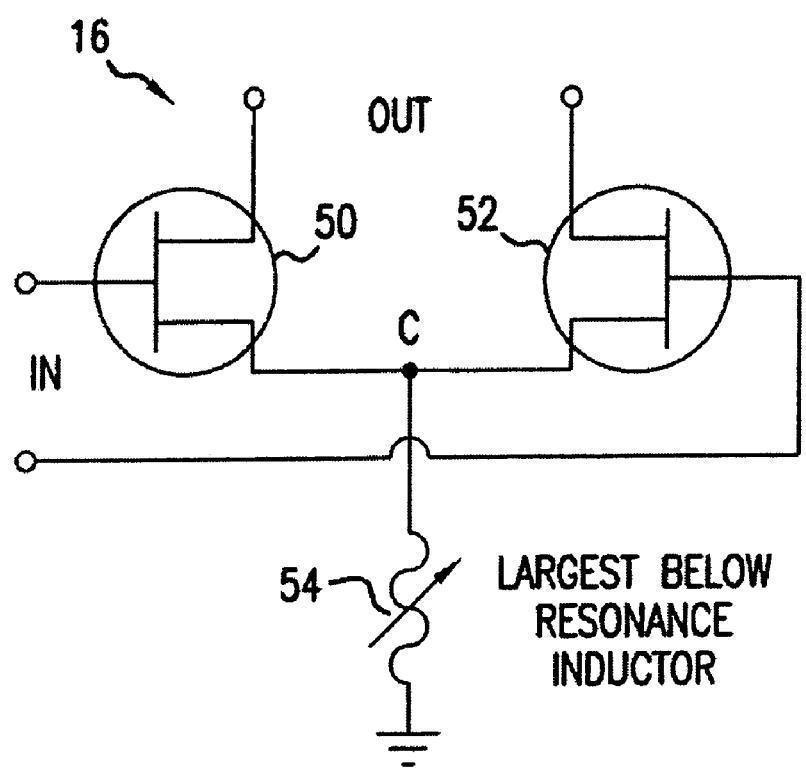
FIG. 5 illustrates the differential low noise amplifier shown in FIG. 2.

FIG. 5 illustrates the low noise power amplifier (LNA) 16 shown in FIG. 2. The sources of a first and second FET 50, 52 are tied together at node C. An inductor 54 connects between node C and ground. A differential input may be applied across the gates of the first and second FETS 50, 52. A differential output reading may be taken across the sources of the first and second FETs 50, 52.

The LNA tends to be sensitive to interference from the PA. This interference is common mode in the present invention and so is much less of a factor. Hence, this can result in reduced current requirements.

Figure 6:
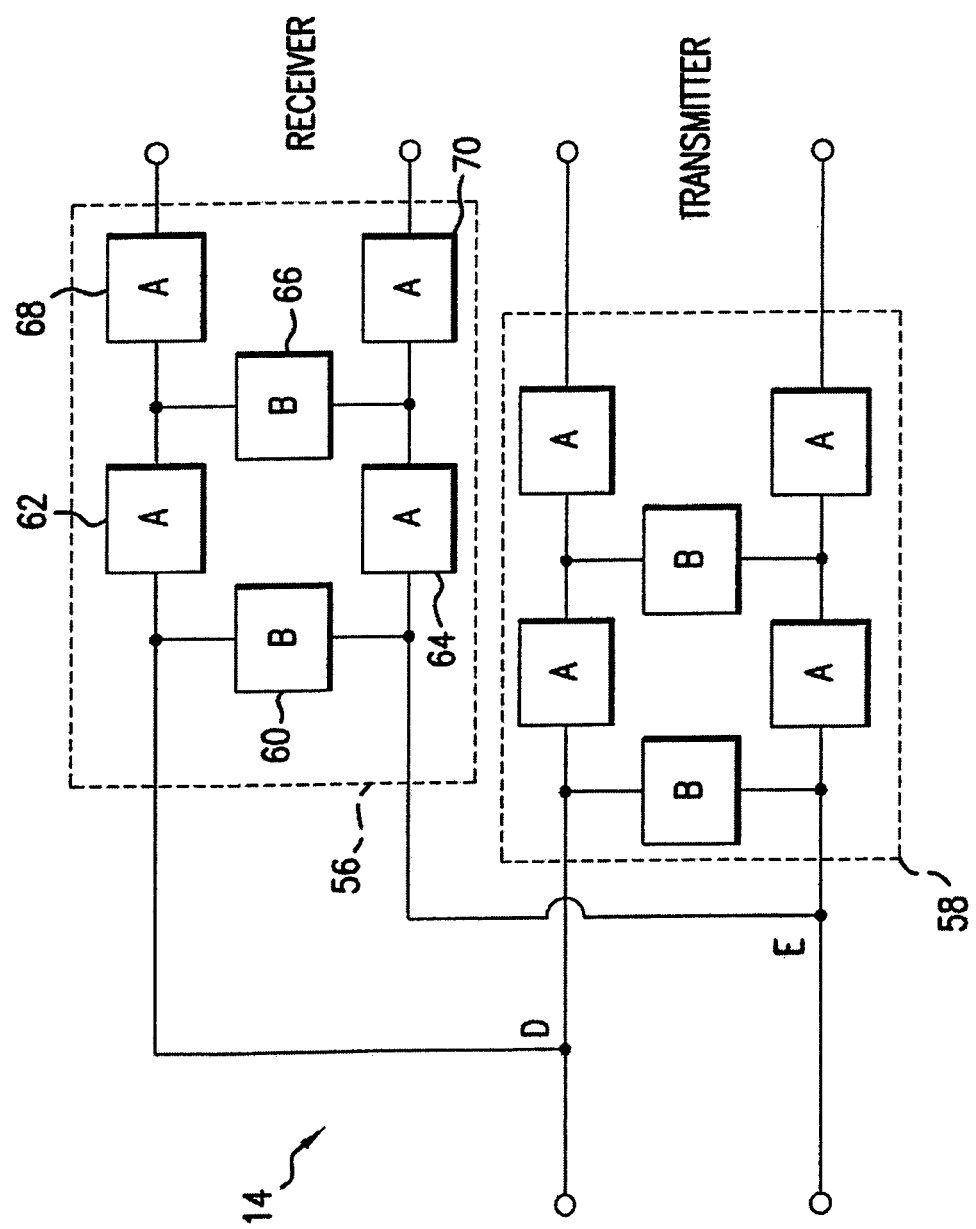
FIG. 6 illustrates the duplexer shown in FIG. 2.

FIG. 6 illustrates the duplexer 14 shown in FIG. 2. The output of the differential antenna is applied across node D and node E. A first and second duplexer block 56, 58 connects across node D and node E. The first duplexer block 56 provides a differential receiver output. The second duplexer block 58 provides a differential transmitter input.

As the duplexer blocks are identical, the first duplexer block 56 will be described an example. A series resonator is designated by the reference label A in a block and a shunt resonator is designated by the reference label B in a block. A first shunt resonator 60 interposes nodes D and E. A first series resonator 62 connects to node D and a second series resonator 64 connects to node E. A second shunt resistor 66 connects between the first and second series resonators 62, 64. A third series resonator 68 is in series with the first series resonator 62 and a first port. A fourth series resonator 70 is in series with the second series 64 and a second port.

One major limiting factor in the duplexer is the quality of the grounding. There is no grounding in a differential structure. Another historical problem is leakage through the ground path. The supposedly single-ended antenna is pushing power into its neighboring ground plane, where the duplexer must be.

Using Film Bulk Acoustic Resonator (FBAR) technology, the duplexer is not limited to a single-ended structure.

Figure 7A:
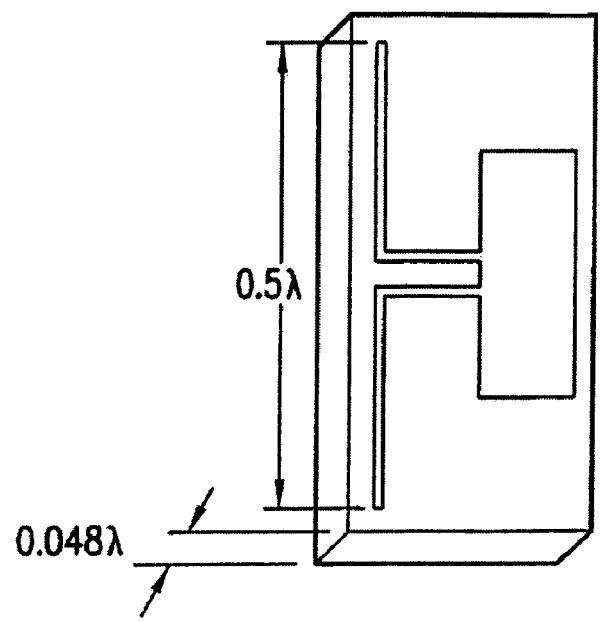
FIG. 7 illustrates the antenna shown in FIG. 2.
Figure 7B:
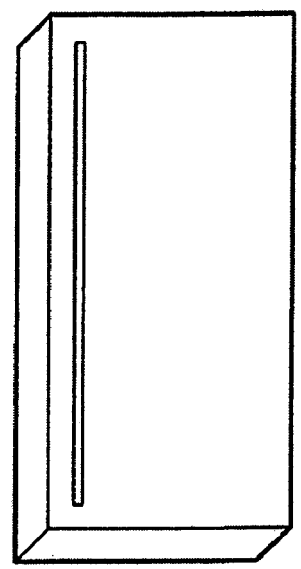

FIGS. 7A–B illustrates the antenna 12 shown in FIG. 2. FIG. 7A illustrates the top of a printed circuit board (PCB). FIG. 7B illustrates the bottom of the PCB. It is preferable that the antenna be implemented as a Yagi-Uda antenna. The structure at its simplest is a λ/2 dipole with a reflector 0.048λ behind it. The 0.048λ is approximately the thickness of the PCB and so this structure may be incorporated into the PCB that composes the handset itself. The thickness of the layer between the reflector and the fed element is of second order importance only, and so is not required to be high tolerance. The resulting antenna requires no additional components. This reduces the handset cost and makes the design simpler.

The Yagi-Uda has a 70 Ω impedance with about a 10% bandwidth at the 2:1 VSWR limit. While this is sufficient for narrow band applications, for a dual band cellphone, it is likely that two antennae would be used. One advantage to this structure is that it has directivity. This allows for the handset to preferentially send the bulk of the transmitted power away from the user's head.

I claim:

1. A differential radio comprising:
    a differential antenna having an input and an output;
    a differential duplexer including film bulk acoustic resonators, generating tow receiving signals and receiving two transmitting signals, electrically connected to the input and output of the differential antenna;
    a differential low noise amplifier, receiving the two receiving signals, generating two LNA signals, including,
    an input matching network (IMN) having a differential input and a first and second IMN output;
    a first capacitor, connected to the drain of the first FET;
    a second FET, having a gate connected to the first capacitor;
    a third FET, having a source connected to the source of the second FET;
    an output matching network (OMN), having a first input connecting to the drain of the second FET and a second input connecting to the drain of the third FET;
    a first inductor connecting between the source of the second FET and ground;
    a second capacitor connected to the gate of the third FET;
    a fourth FET having a drain connected to the second capacitor, a gate connected to the second IMN output, a source connected to the source of the first FET; and
    a second inductor connects between the source of the first FET and ground;
    a differential filter receiving the two LNA signals and generating a first differential filter signal;
    a first differential mixer receiving the first differential signal and generating a first differential mixer output signal;
    a signal, processing section, receiving the first differential mixer output signal, generating a conditioned differential signal;
    a second differential mixer, receiving the conditioned differential signal, generating a second differential mixer output signal;
    a second differential filter, receiving the second differential mixer output signal, generating a second differential filter signal; and
    a differential power amplifier receiving the second differential filter signal and generating the two transmitting signals.

2. A differential radio as in claim 1, wherein the differential antenna is incorporated into a printed circuit board.

* * * * *

UNITED STATES PATENT AND TRADEMARK OFFICE
CERTIFICATE OF CORRECTION

PATENT NO. : 7,031,689 B2  Page 1 of 1
APPLICATION NO. : 10/008492
DATED : April 18, 2006
INVENTOR(S) : Michael Frank It is certified that error appears in the above-identified patent and that said Letters Patent is hereby corrected as shown below:

Col. 4 Line 13 In Claim 1, delete "tow" and insert -- two --, therefor.

Col. 4 Line 21 In Claim 1, before "a" insert -- a first field effect transistor (FET), having a gate connected to the first IMN output; --, as a separate line therefor.

Col. 4 Line 25 In Claim 1, delete "FET;" and insert -- FET [at a first node]; --, therefor.

Col. 4 Line 37(Approx.) In Claim 1, before "differential" insert -- first --.

Col. 4 Line 42(Approx.) In Claim 1, delete "signal," and insert -- signal --, therefor.

Col. 4 Line 42 In Claim 1, after "section," insert -- conditioning circuit, --.

Signed and Sealed this

Seventeenth Day of February, 2009

JOHN DOLL
*Acting Director of the United States Patent and Trademark Office*